United States Patent
Navarro, Jr. et al.

(10) Patent No.: US 8,326,561 B2
(45) Date of Patent: Dec. 4, 2012

(54) DYNAMIC MOTION CONTROL

(75) Inventors: Alfonso R. Navarro, Jr., Manchester, NH (US); Frederic S. Boericke, II, Mount Vernon, NH (US); Kenneth D. Rolt, Westford, MA (US); Stephen G. Boucher, Amherst, NH (US); Roger H. Tancrell, Wilmington, MA (US)

(73) Assignee: Airmar Technology Corporation, Milford, NH (US)

(*) Notice: Subject to any disclaimer, the term of this patent is extended or adjusted under 35 U.S.C. 154(b) by 246 days.

(21) Appl. No.: 12/154,147

(22) Filed: May 20, 2008

(65) Prior Publication Data

US 2009/0292495 A1 Nov. 26, 2009

(51) Int. Cl.
*G01C 17/38* (2006.01)

(52) U.S. Cl. .................................... 702/93

(58) Field of Classification Search .............. 702/93, 702/95, 150, 153
See application file for complete search history.

(56) References Cited

U.S. PATENT DOCUMENTS

| | | | |
|---|---|---|---|
| 3,091,127 A | 5/1963 | Depp | |
| 3,691,643 A | 9/1972 | Baker et al. | |
| 5,699,256 A * | 12/1997 | Shibuya et al. | 701/509 |
| 5,953,683 A * | 9/1999 | Hansen et al. | 702/95 |
| 6,588,117 B1 | 7/2003 | Martin et al. | |
| 6,820,025 B2 | 11/2004 | Bachmann et al. | |
| 7,089,148 B1 | 8/2006 | Bachmann et al. | |
| 7,451,549 B1 | 11/2008 | Sodhi et al. | |
| 7,844,415 B1 | 11/2010 | Bryant et al. | |
| 7,930,148 B1 | 4/2011 | Figaro et al. | |
| 2004/0020064 A1 | 2/2004 | Levi et al. | |
| 2006/0236910 A1 | 10/2006 | Boucher et al. | |

FOREIGN PATENT DOCUMENTS

| | | |
|---|---|---|
| EP | 0 451 988 A1 | 10/1991 |
| EP | 0 485 132 A2 | 5/1992 |
| FR | 2389869 | 5/1977 |
| JP | 63132111 A | 11/1986 |

OTHER PUBLICATIONS

Cho, et al., "Tilt Compensation Algorithm for 2-Axis Magnetic Compass," *IEEE Electronic Letters*, vol. 39, No. 22, 2 pages (Aug. 27, 2003).

Great Britain Patents Act 1977: Search Report under Section 17(5) dated Sep. 7, 2009 for Great Britain Appl. No. GB0908387.4.

* cited by examiner

*Primary Examiner* — Stephen Cherry

(57) ABSTRACT

In one embodiment a method and corresponding apparatus are arranged to determine an accurate device heading by continuously combining an average magnetic heading with the compensated inertial heading. The example embodiment obtains the compensated inertial heading by compensating for a time delay of an inertial heading.

31 Claims, 22 Drawing Sheets

DYNAMIC MOTION CONTROL

BACKGROUND

Three dimensional compass devices utilize accelerometers and rate gyros. In a mobile dynamic environment, accelerometers are susceptible to lateral accelerations of translation, which may corrupt tilt calculations. Rate gyros are susceptible to a drift induced by physical properties of the manufacture of the device and changes of temperature.

SUMMARY

An example embodiment of the present invention relates to a method and corresponding apparatus arranged to determine an accurate device heading by continuously combining an average magnetic heading with the compensated inertial heading. The example embodiment obtains the compensated inertial heading by compensating for a time delay of an inertial heading.

Another embodiment of the present invention relates to a method and corresponding apparatus that continuously combines an inertial heading and an average magnetic heading to provide accurate device heading.

In the view of the foregoing, the following description illustrates example embodiments and features that may be incorporated into a system for determining accurate heading, where the term "system" may be interpreted as a system, a subsystem, apparatus, method or any combination thereof, with regard to embodiments of the present invention.

The system may determine the average magnetic heading by translating a magnetic heading from a device frame of reference to earth's frame of reference. In order to determine the average magnetic heading, the system may correct the magnetic heading to remove artifacts. The system may apply at least one low-pass filter to the magnetic heading to remove the artifacts. Additionally, in order to determine the average magnetic heading the system may correct orientation measurements of the device frame of reference to remove short term dynamic accelerations. The system may apply at least one low-pass filter to the orientation measurements of the device frame of reference to remove the short term dynamic accelerations.

The system may compensate for the time delay of the inertial heading by correcting orientation corruptions in the inertial heading. In order to correct orientation corruptions in the inertial heading, the system may apply at least one low-pass filter to the orientation corruptions in the inertial heading. The system may adjust the at least one low-pass filter by long term measurements from the inertial heading. Additionally, the system may compensate for the time delay of the inertial heading by filtering long term drift from measurements of the inertial heading.

The system may correct orientation corruptions in the inertial heading. In order to correct the orientation corruptions in the inertial heading, the system may apply at least one low-pass filter to the orientation corruptions. The system may adjust the at least one low-pass filter by long term measurements from the inertial heading. The system may adjust the at least one low-pass filter by long term measurements from the magnetic heading.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

One example embodiment of the present invention relates to determining accurate device heading using inexpensive sensors with inherent error and a low cost microprocessor.

Figure 1:
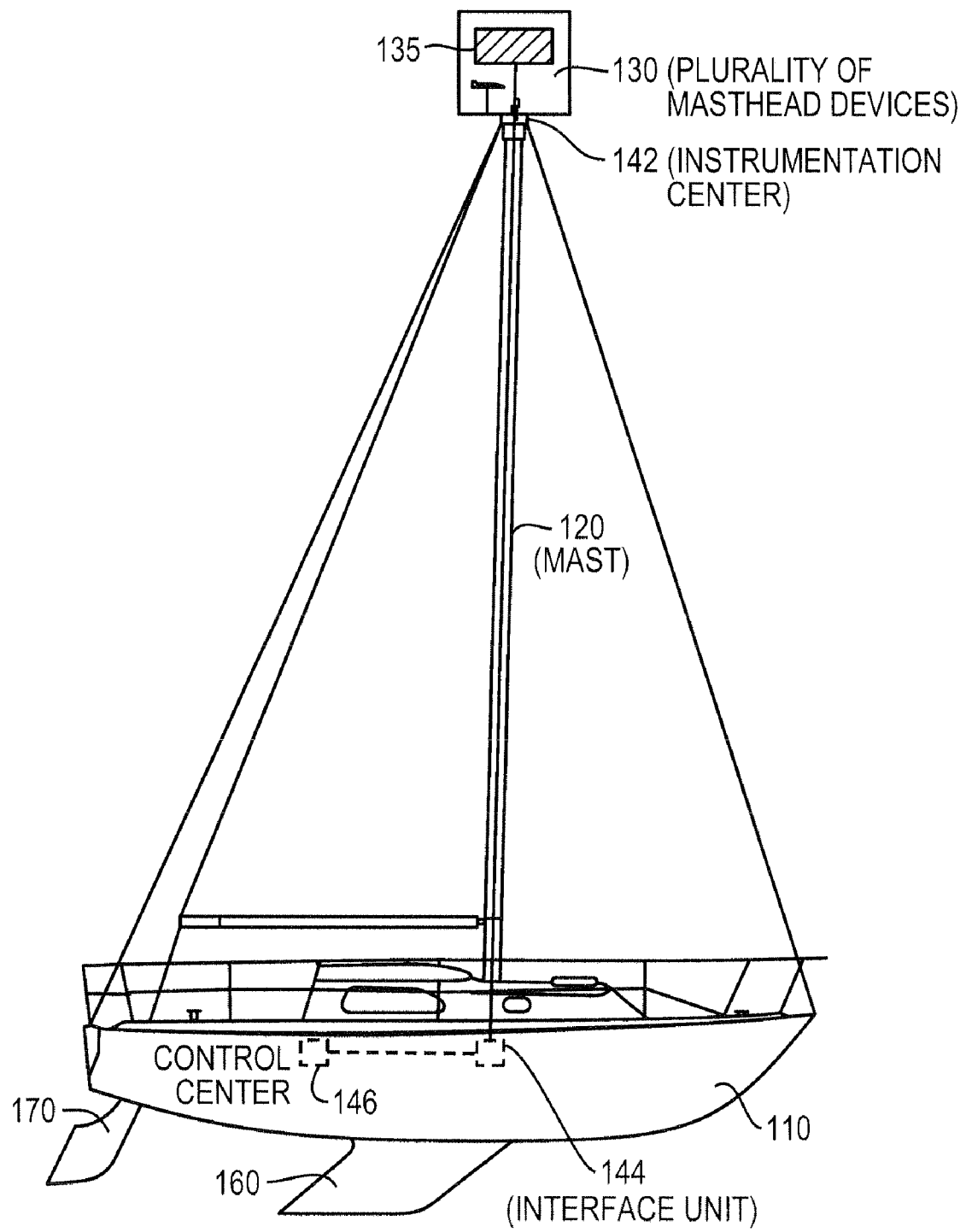
FIG. 1 is an illustration of a perspective view of a sailboat.

FIG. 1 illustrates a perspective view of a sail vessel 100 (illustrated in U.S. patent application 2006/0236910, the teachings of which are incorporated by reference in its entirety). The sail vessel 100 may include a hull 110, a mast 120, a centerboard or keel 160, and a rudder 170. Typically, the hull 110, the mast 120, and the keel 160 are designed to ensure the static and dynamic stability of the sailing vessel 100. The sail vessel 100 may also include a control system. The control system may include an interface unit 144, and a control center 146, and an instrumentation center 142. The interface unit 144 and the control center 146 may be located on board of the sail vessel 100 and provide a means for communicating with the instrumentation center 142. The instrumentation center 142 is located atop the mast 120 and provides a means for mounting a plurality of masthead devices 130. The plurality of masthead devices 130 may include a module for determining accurate device (i.e, vessel) heading 135 according to an example embodiment of the present invention.

The module for determining accurate device heading 135 may acquire the device heading from a unit arranged to obtain directions with respect to the earth (e.g., a magnetic compass). A typical magnetic compass includes a magnetized needle that aligns itself with the earth's magnetic field. The reading obtained from a magnetic compass is usually indicative of the cardinal points of north, south, east, and west. However, since the earth's magnetic field's north direction is often different from the true north direction, the readings obtained from the compass may need to be adjusted to compensate for this difference.

The module for determining accurate device heading 135 may include a three-dimensional compass. Three-dimensional compass devices may utilize micro-machined magnetometers, micro-machined accelerometers and gyroscopes.

A gyroscope is usually used to obtain current orientation of a device by measuring the angular velocity in the inertial frame of reference. Conventional gyroscopes usually include a wheel that is designed to freely rotate and orient itself in any orientation. In a three-dimensional compass, accelerometers are used alongside gyroscopes to measure acceleration, inclination, and vibrations in the inertial reference frame. The three-dimensional compass employs the angular velocity obtained from the gyroscope along with the acceleration measure obtained from the accelerometer to determine the inertial position of the device. These errors in measurements of angular velocity and acceleration may be compounded to cause large errors in determining the inertial position of the device.

One embodiment of the present invention relates to a method and corresponding apparatus for correcting for these errors in a continuous manner, while requiring minimal initialization or end-user intervention.

Figure 2A:
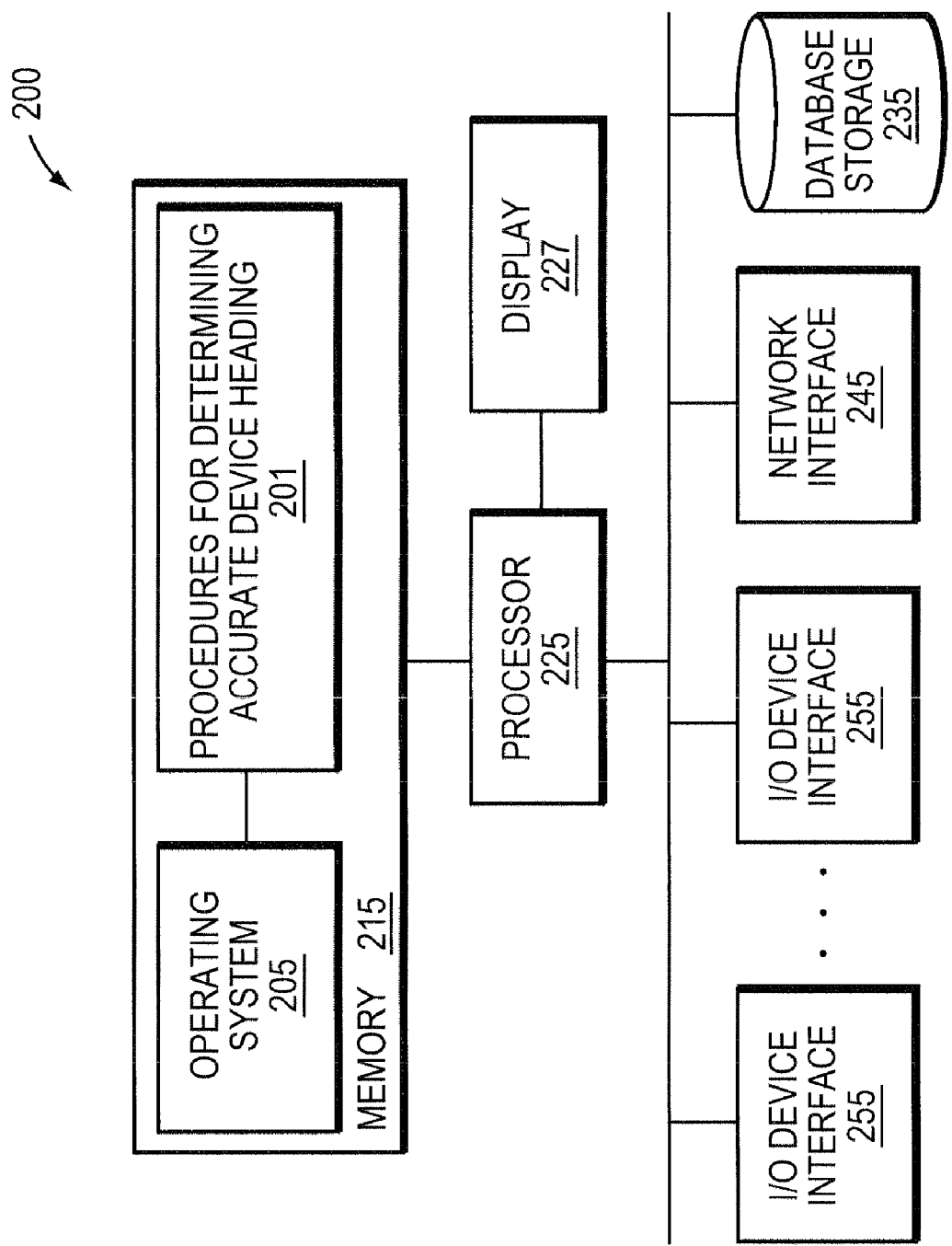
FIG. 2A is an example illustration of a management unit that may be used with the techniques described herein.

FIG. 2A is an example illustration of a management unit 200 that may be used with the techniques described herein. The components of the management unit 200 may be fully or partially placed in the instrumentation center 142, on top the mast 120, as a part of the plurality of mast head devices 130, in the control center 146, in the interface unit 144, or in the module for determining the accurate device heading 135.

The management unit 200 may include a memory unit 215 along with a processor 205 that may be connected to various interfaces via an input/output (I/O) device interface 255. The memory unit 215 may be a computer-readable memory and include combinations of non-volatile memory devices. The memory unit 215 is configured to hold various computer-executable instructions and data structures including computer-executable instructions and data structures that implement aspects of the techniques described herein.

Figure 2B:
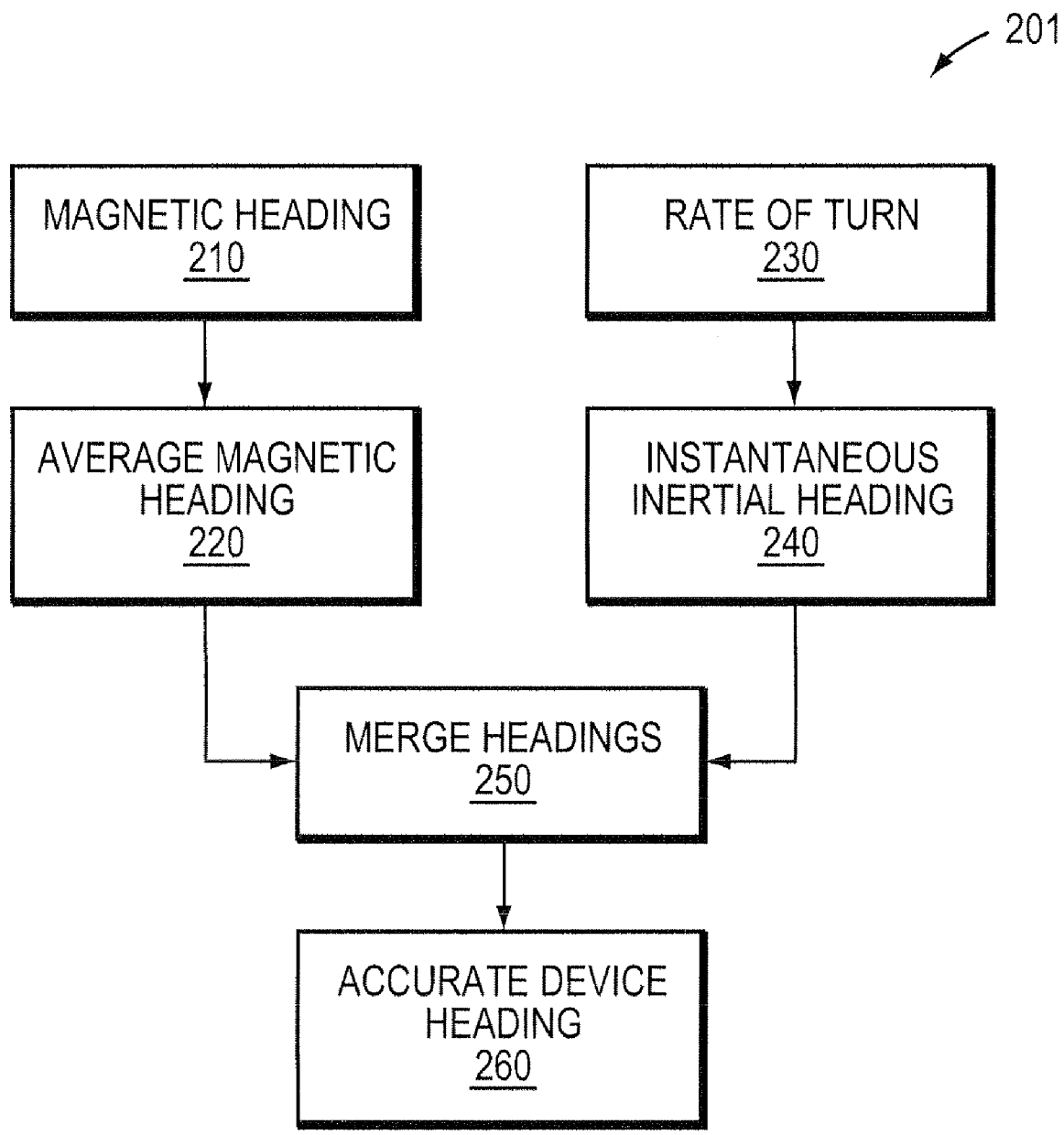
FIG. 2B is a high-level flow diagram of procedures for an example embodiment.

The memory unit 215 may include a unit for procedures involved in determining accurate device heading 201 according to an example embodiment of the present invention (illustrated in detail in FIG. 2B).

The memory unit 215 may also include an operating system 205 and be arranged to implement various conventional operating system functions including task and process scheduling, memory management, and controlled access to various devices, such as a database storage unit 235. The processes may include computer-executable instructions and data that are configured to implement various aspects of the techniques described herein.

The management unit 200 may also include a network interface 245 to connect the system to a network. The processor 205 may include a conventional central processing unit (CPU) comprising processing circuitry that is configured to execute various instructions and manipulate data structures from the memory unit 215.

The I/O device interfaces 255 may include logic to interface with various input and/or output devices, such as a keypad or mouse and with the processor 225. The I/O device interfaces 255 may be configured to allow signals to be transferred between the management unit 200 and other components of the system.

The management unit 200 may include a display unit 227 to display accurate device heading.

FIG. 2B is a high-level flow diagram of procedures 201 for an example embodiment. The example embodiment obtains an average magnetic heading 220 for a device (e.g., an airplane, a vessel, a moving vehicle or robot) based on its magnetic heading 210. The example embodiment may obtain the magnetic heading 210 from a variety of sources such as a magnetic compass. The example embodiment also obtains an instantaneous inertial heading 240 using a rate of turn (yaw rate) 230 of the device. The example embodiment may obtain the rate of turn 230 from a gyroscope or a rate gyro.

The example embodiment determines the accurate device heading 260 by continuously merging 250 an average magnetic heading 220 and an instantaneous inertial heading 240.

Figure 2C:
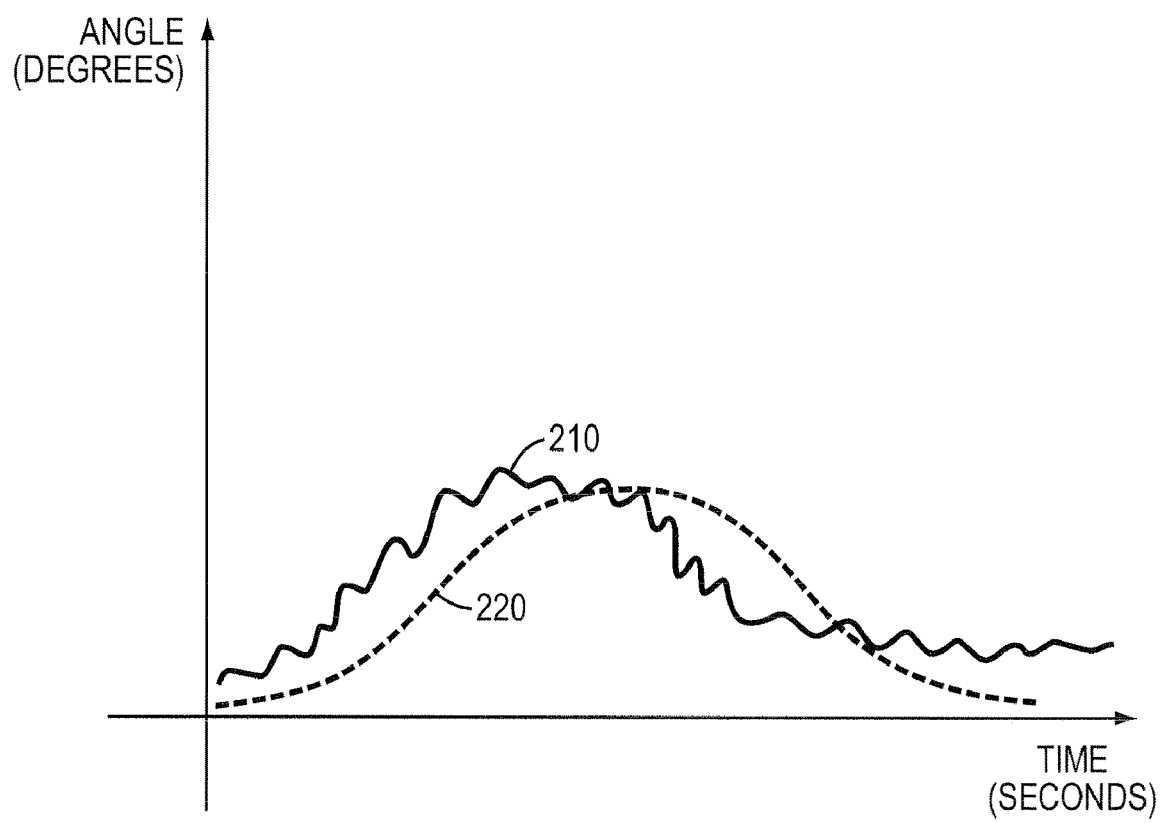
FIG. 2C includes plots of magnetic heading and average magnetic heading signals according to an example embodiment.

FIG. 2C includes plots of magnetic heading and average magnetic heading signals according to an example embodiment. The magnetic headings 210 of a device may be obtained from a variety of sources such as a magnetic compass or a magnetometer. The example embodiment may obtain the average magnetic heading 220 by assuming that motion of the device is periodic on some time frame, and that the device will not accelerate in one translational direction indefinitely. The example embodiment may correct the magnetic heading 210 to remove artifacts and determine the average magnetic heading 220 by translating the corrected magnetic heading from a device frame of reference to earth's frame of reference.

Figure 2D:
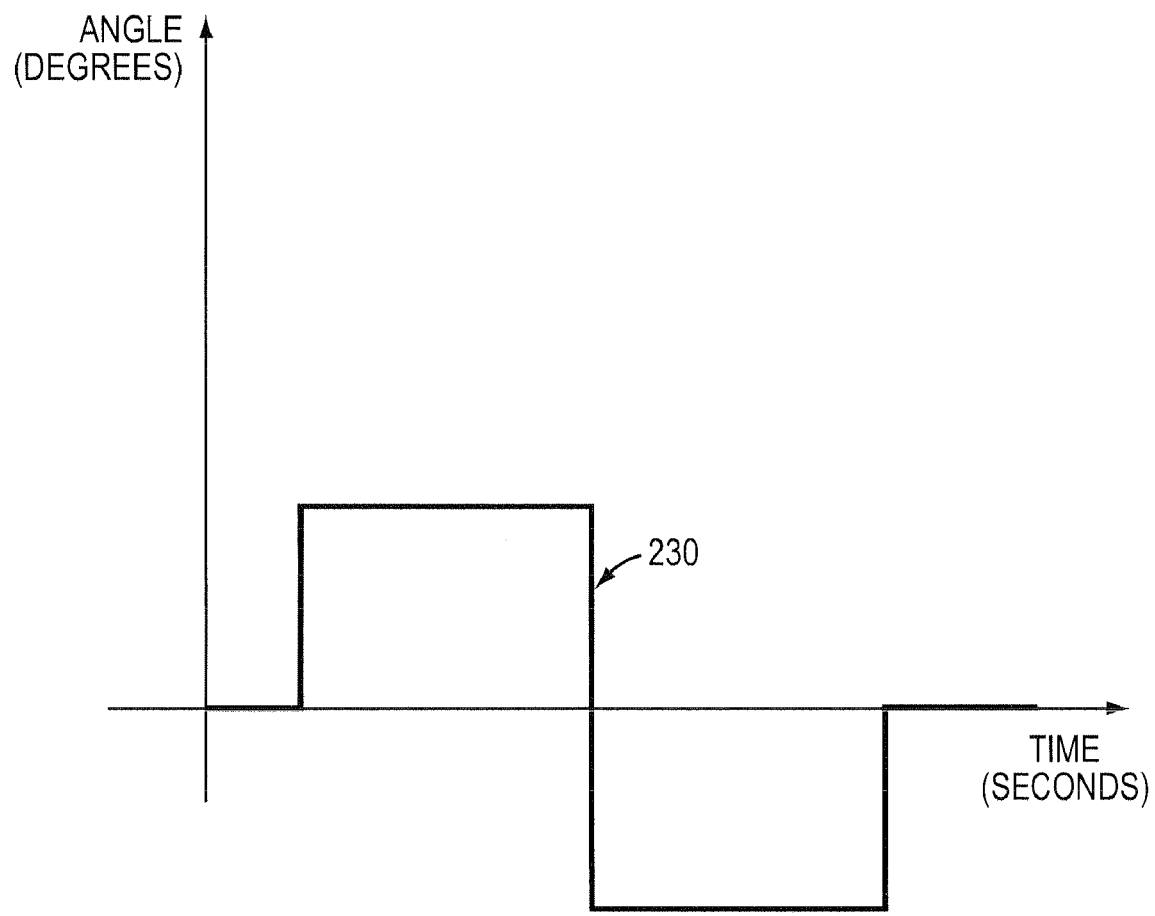
FIG. 2D is a plot of a rate of turn signal according to an example embodiment.

FIG. 2D is a plot of a rate of turn 230 signal according to an example embodiment. The rate of turn 230 is the measure of the rate of change of the angle between a device heading and a reference heading. The reference heading may include the true north or the magnetic north for the device. The example embodiment may obtain the rate of turn 230 from a gyroscope or a rate gyro. Such devices are often susceptible to a drift (i.e., small errors in measurements of angular velocity and zero fluctuations) induced by physical properties of the manufacture of the device and changes of temperature. Thus, the rate of turn 230 may suffer from a drift.

Figure 2E:
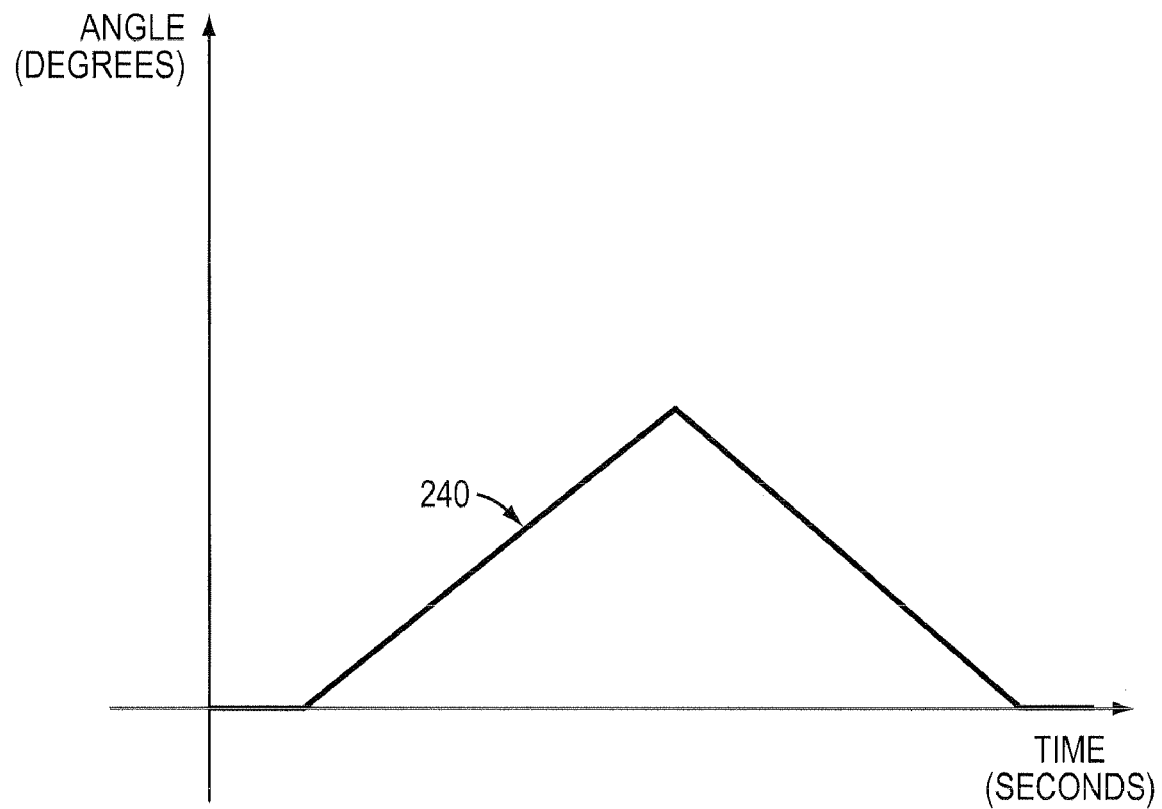
FIG. 2E is a plot of an instantaneous inertial heading signal according to an example embodiment.

FIG. 2E is a plot of an instantaneous inertial heading 240 signal according to an example embodiment. The example embodiment may obtain the instantaneous inertial heading 240 using the rate of turn 230 of the device. Specifically, the example embodiment may filter the drift in the rate of turn

230 by assuming that it occurs over a long time frame, and remove any very long term Bias artifacts with a low pass filter. The example embodiment may obtain a relative heading for the device based on the corrected yaw rate and filter the calculated relative heading to remove any possible corruptions and obtain the instantaneous inertial heading 240 for the device.

Figure 2F:
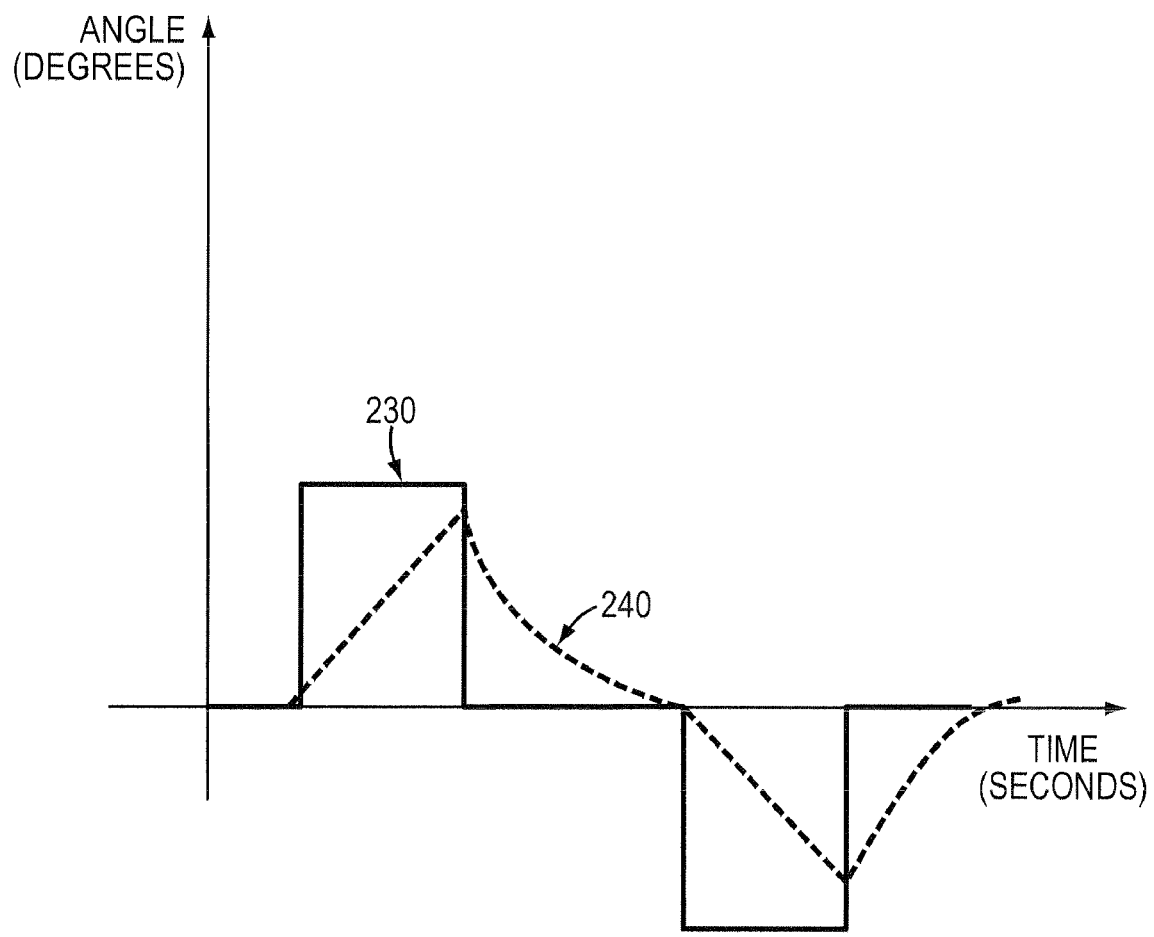
FIG. 2F includes plots of rate of turn and instantaneous inertial heading signals according to an example embodiment.

FIG. 2F includes plots of rate of turn 230 and instantaneous inertial heading 240 signals according to an example embodiment. As explained above, the example embodiment may obtain the instantaneous inertial heading 240 by filtering possible corruptions and drift from the rate of turn 230.

Figure 2G:
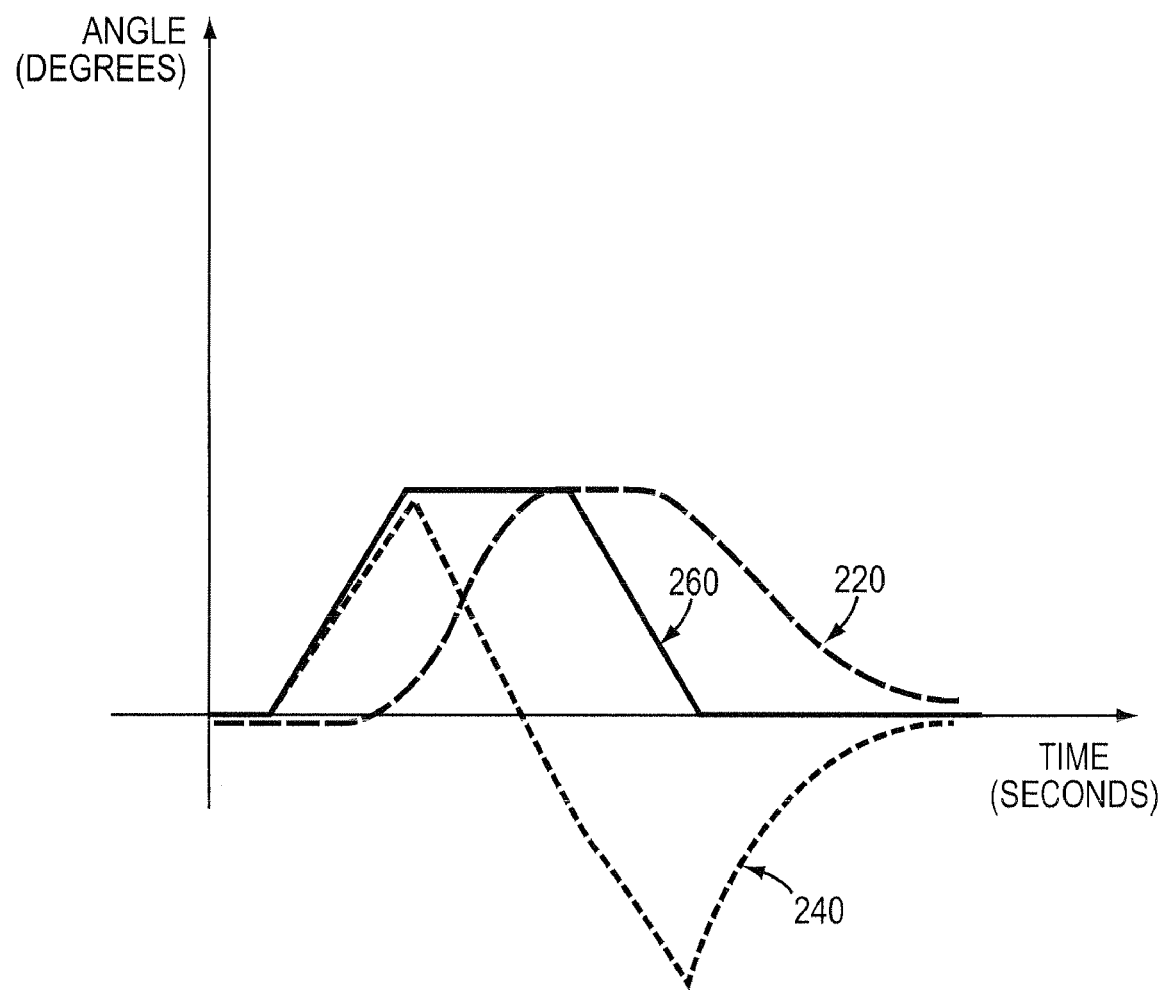
FIG. 2G includes plots of average magnetic heading, instantaneous inertial heading, and accurate device heading signals according to an example embodiment.

FIG. 2G includes plots of average magnetic heading 220, instantaneous inertial heading 240, and accurate device heading 260 signals according to an example embodiment. In order to obtain the accurate device headings 260, the example embodiment may merge the instantaneous heading 240 with the average magnetic heading 220.

Figure 3A:
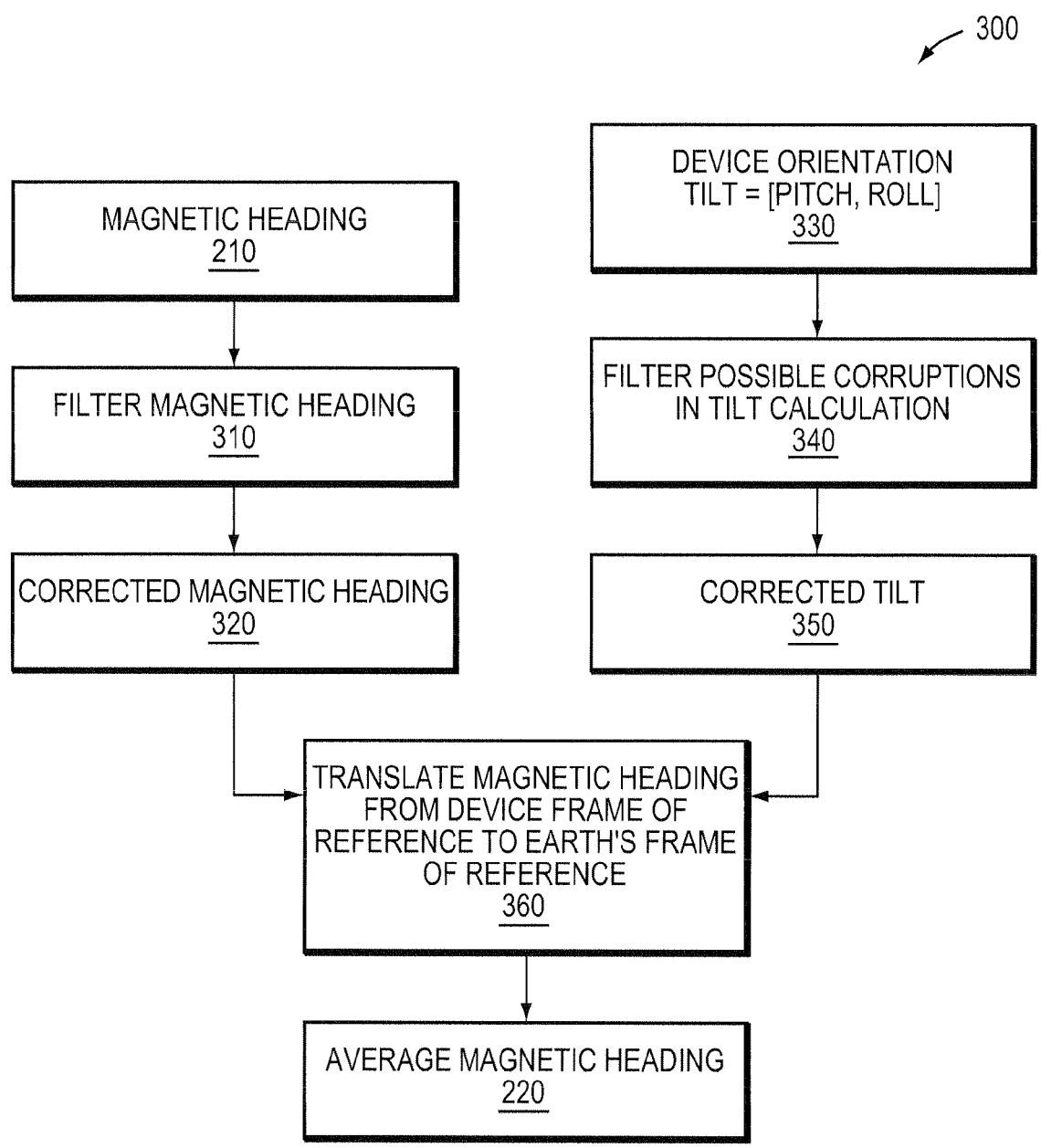
FIG. 3A is a flow diagram illustrating procedures for obtaining the average magnetic heading according to an example embodiment.

FIG. 3A is a flow diagram illustrating procedures for obtaining the average magnetic heading according to an example embodiment.

This example embodiment 300 corrects a magnetic heading by assuming that motion is periodic on some time frame, and that the device will not accelerate in one translational direction indefinitely. Specifically, the example embodiment 300 corrects the magnetic heading 210 to remove artifacts. The example embodiment may obtain the magnetic heading 210 from a variety of sources such as a magnetic compass or a magnetometer. In order to obtain a corrected magnetic heading 320, the example embodiment 300 may filter the magnetic heading 210. In doing so, the example embodiment may employ methods such as low-pass filtering. The example embodiment 300 may also correct device orientation measures 330 (i.e., device tilt=[pitch, roll]) to remove short term dynamic accelerations. The example embodiment 300 may obtain the device orientation measures 330 from sources such as an accelerometer. Since such devices (e.g., accelerometers) are susceptible to lateral accelerations of translation, the tilt calculations may need to be corrected to remove possible corruptions. Thus, the example embodiment 300 obtains the corrected tilt 350 by filtering possible corruptions 340. In order to filter the corruptions, the example embodiment 300 may employ low-pass filters.

The example embodiment 300 may determine the average magnetic heading 220 by translating the corrected magnetic heading 320 from a device frame of reference to earth's frame of reference.

Thus, the example embodiment 300 filters (e.g., using low-pass filter(s)) the magnetic heading and tilt data, and brings both to the same frame of reference. This results in obtaining the average magnetic heading 220 of the device, over some period of time determined by the filter time constant.

Figure 3B:
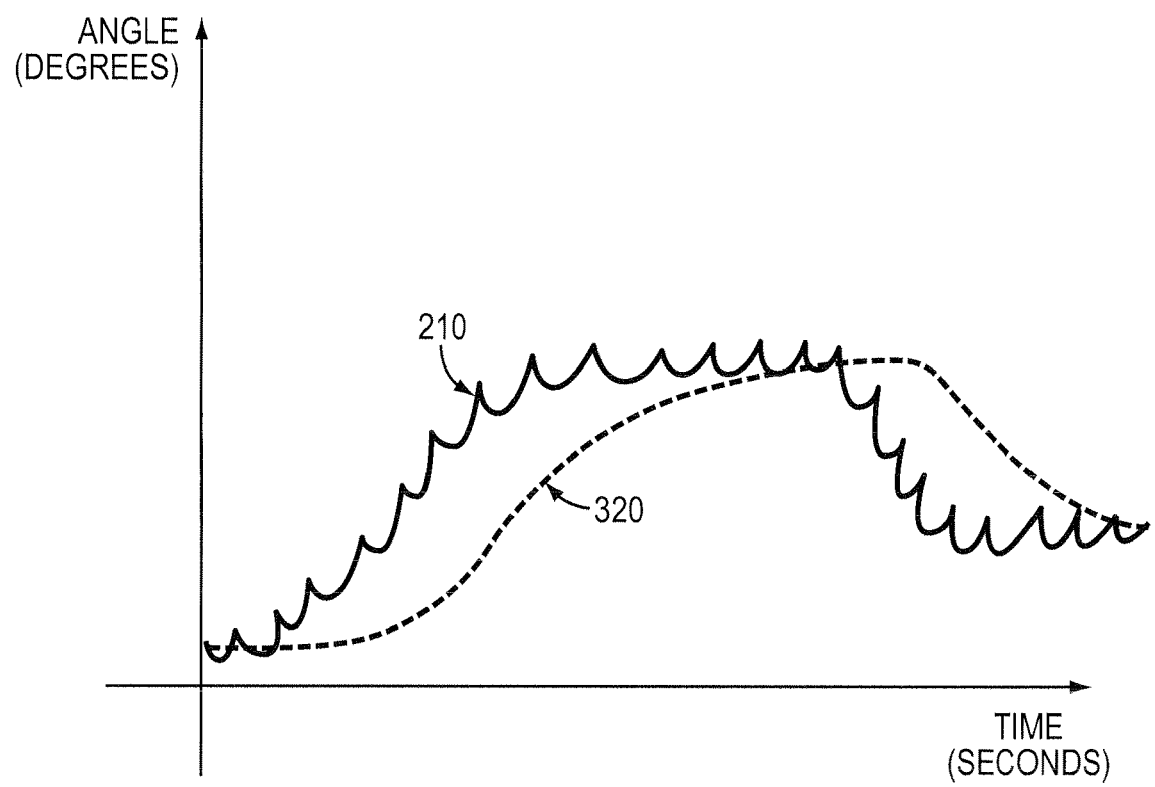
FIG. 3B includes plots of magnetic heading and corrected magnetic heading signals according to an example embodiment.

FIG. 3B includes plots of magnetic heading 210 and corrected magnetic heading 320 signals according to an example embodiment. The example embodiment may obtain the magnetic heading 210 from sources such as a magnetic compass or a magnetometer. In order to obtain a corrected magnetic heading 320, the example embodiment may filter the magnetic heading 210 to remove artifacts. The example embodiment may correct the magnetic heading 210 by assuming that motion is periodic on some time frame, and that the device will not accelerate in one translational direction indefinitely.

Figure 3C:
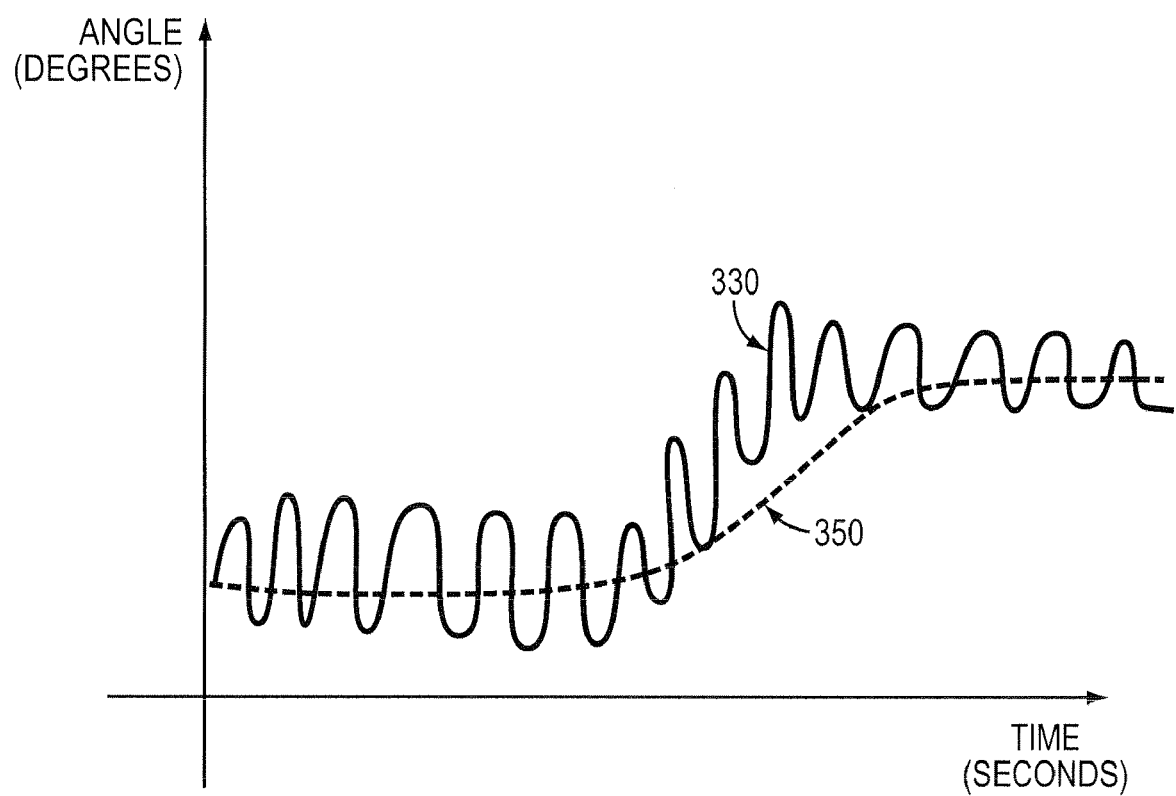
FIG. 3C includes plots of device orientation (tilt) and corrected device orientation (corrected tilt) signals according to an example embodiment.

FIG. 3C includes plots of device orientation (tilt) 330 and corrected device orientation (corrected tilt) 350 signals according to an example embodiment. The example embodiment may obtain the device tilt 330 from sources such as an accelerometer. Since such devices are susceptible to lateral accelerations of translation, the tilt calculations may need to be corrected to remove possible corruptions. As shown in FIG. 3C, the example embodiment may correct the device tilt 330 to remove the dynamic accelerations and obtain a corrected tilt 350.

Figure 3D:
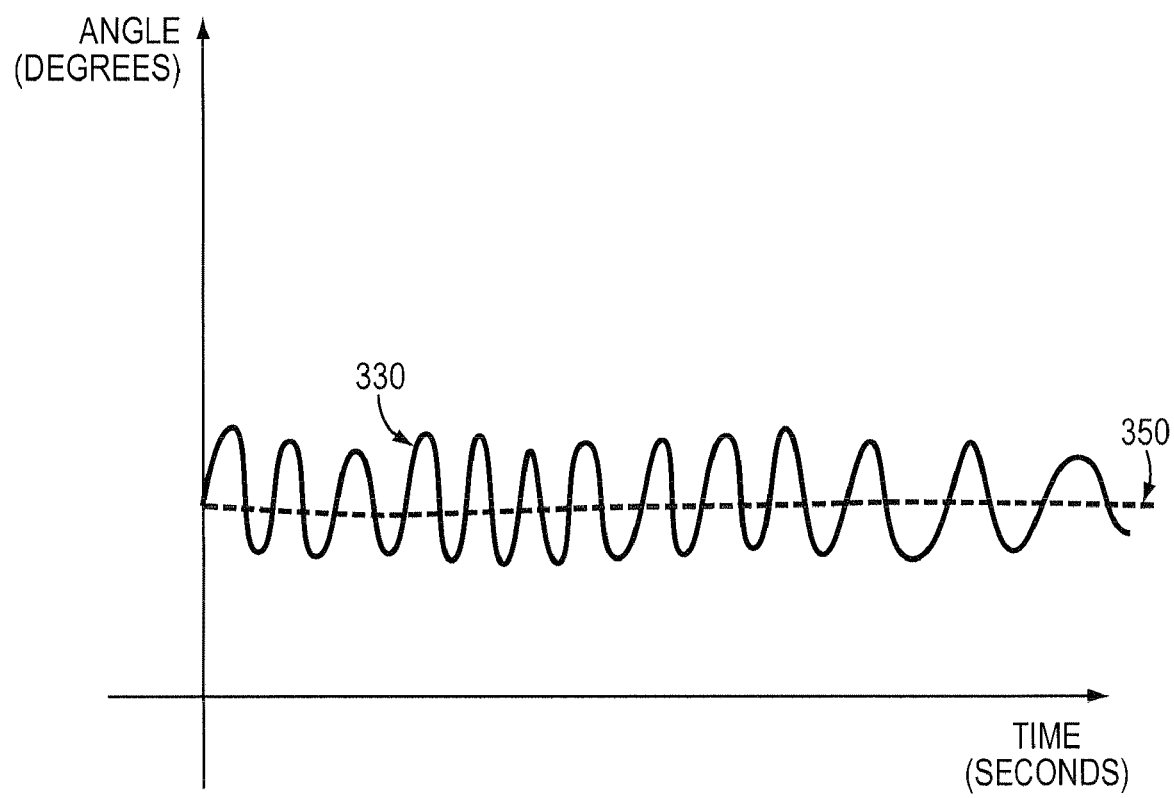
FIG. 3D includes plots of device orientation (tilt) and corrected device orientation (corrected tilt) signals according to an example embodiment.

FIG. 3D is an example of plots of device orientation (tilt) 330 and corrected device orientation (corrected tilt) 350 signals according to another example embodiment. As shown in FIG. 3D, the example embodiment may remove corruptions such as dynamic accelerations from the tilt 330 to obtain a corrected tilt 350.

Figure 3E:
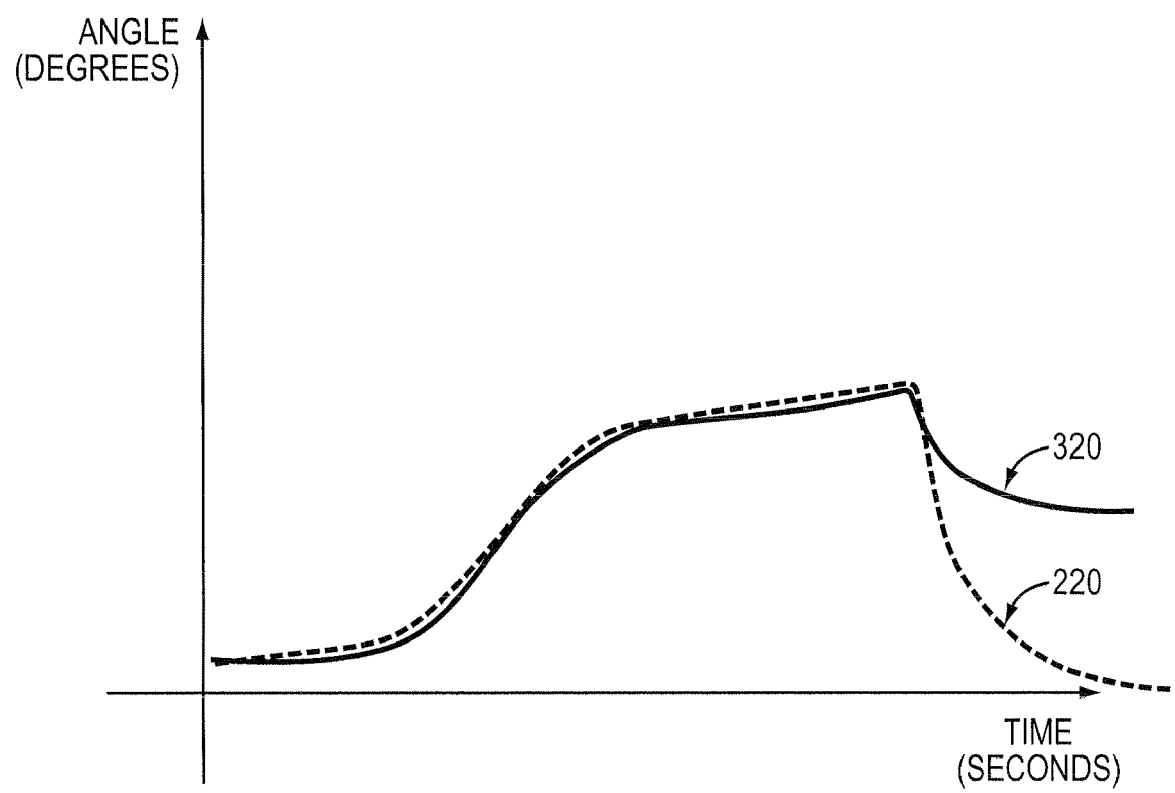
FIG. 3E includes plots of corrected magnetic heading and average magnetic heading signals according to an example embodiment.

FIG. 3E includes plots of corrected magnetic heading 320 and average magnetic heading 220 signals according to an example embodiment. The example embodiment may determine the average magnetic heading 220 by translating the corrected magnetic heading 320 from a device frame of reference to earth's frame of reference. In order to translate the corrected magnetic heading 320 from a device frame of reference to earth's frame of reference, the example embodiment may filter the magnetic heading 210 and tilt 330 data, and bring both to the same frame of reference. This results in obtaining the average magnetic heading 220 of the device, over some period of time determined by the filter time constant.

Figure 4A:
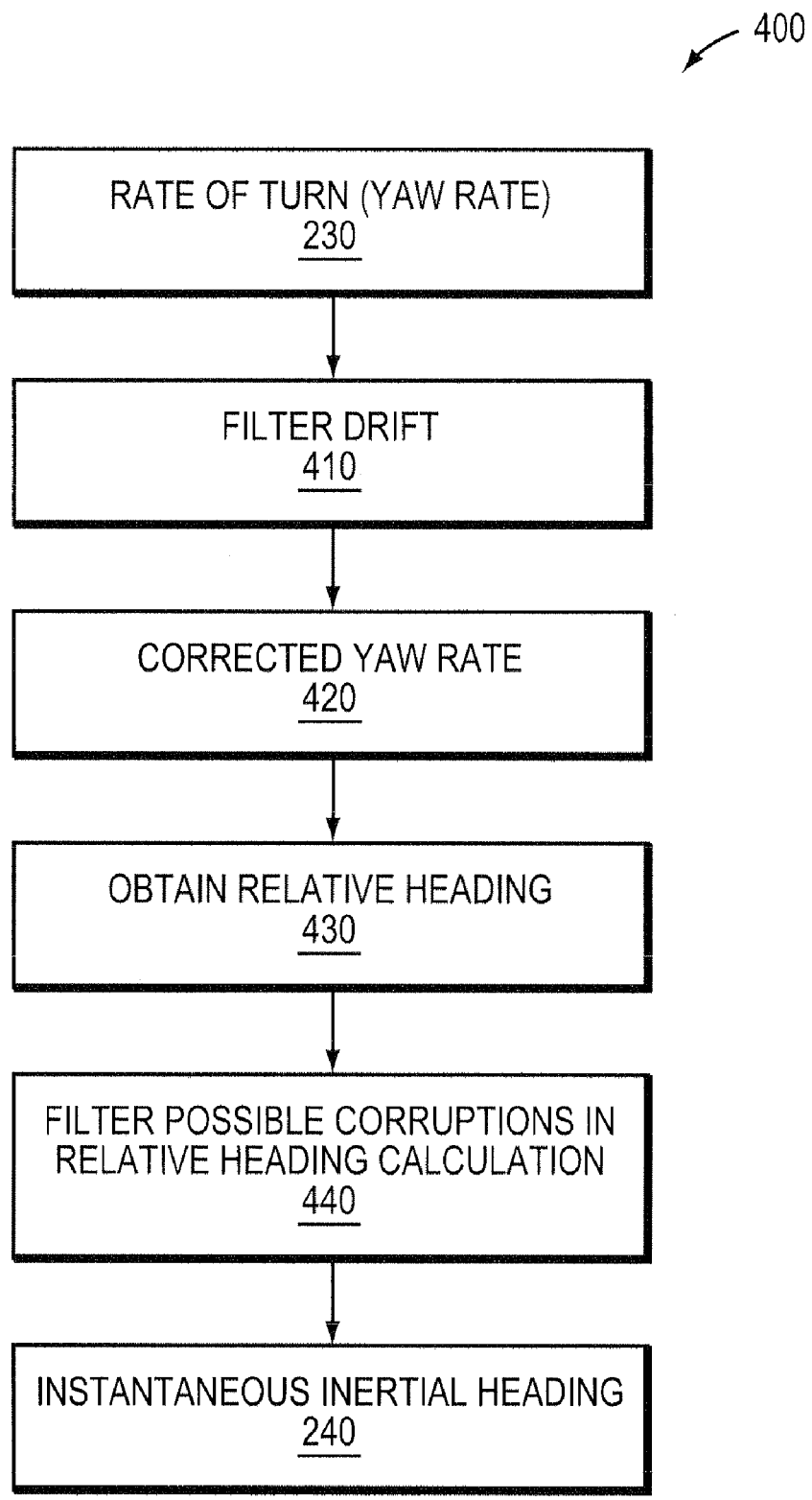
FIG. 4A is a flow diagram illustrating procedures for obtaining instantaneous inertial heading according to an example embodiment.

FIG. 4A is a flow diagram illustrating procedures for obtaining instantaneous inertial heading according to an example embodiment.

The example embodiment 400 compensates for a time delay of the filtered magnetic heading with an inertial heading device (e.g., a gyroscope). Since such inertial heading devices are often susceptible to a drift (i.e., small errors in measurements of angular velocity and zero fluctuations) induced by physical properties of the manufacture of the device and changes of temperature, the example embodiment 400 may need to filter the drift suffered by the inertial heading device.

Thus, the example embodiment 400 filters the drift 401 (shown in FIG. 4C) in the rate of turn 410 (yaw rate) 230 to obtain a corrected yaw rate 420. The example embodiment 400 may filter the drift 410 by assuming that it occurs over a long time frame, and remove any very long term Bias artifacts with a low pass filter. The example embodiment 400 may additionally compensate the Bias by long term measurements from an inertial heading or long term measurements from a magnetic heading.

The example embodiment 400 obtains a relative heading 430 for the device based on the corrected yaw rate 420. The example embodiment 400 may employ an integrator 630 (shown later in FIG. 6) to translate the corrected yaw rate 420 into the relative heading 430. Subsequently, the example embodiment filters the calculated relative heading 435 to remove any possible corruptions and obtain an instantaneous inertial heading 240 for the device.

Figure 4B:
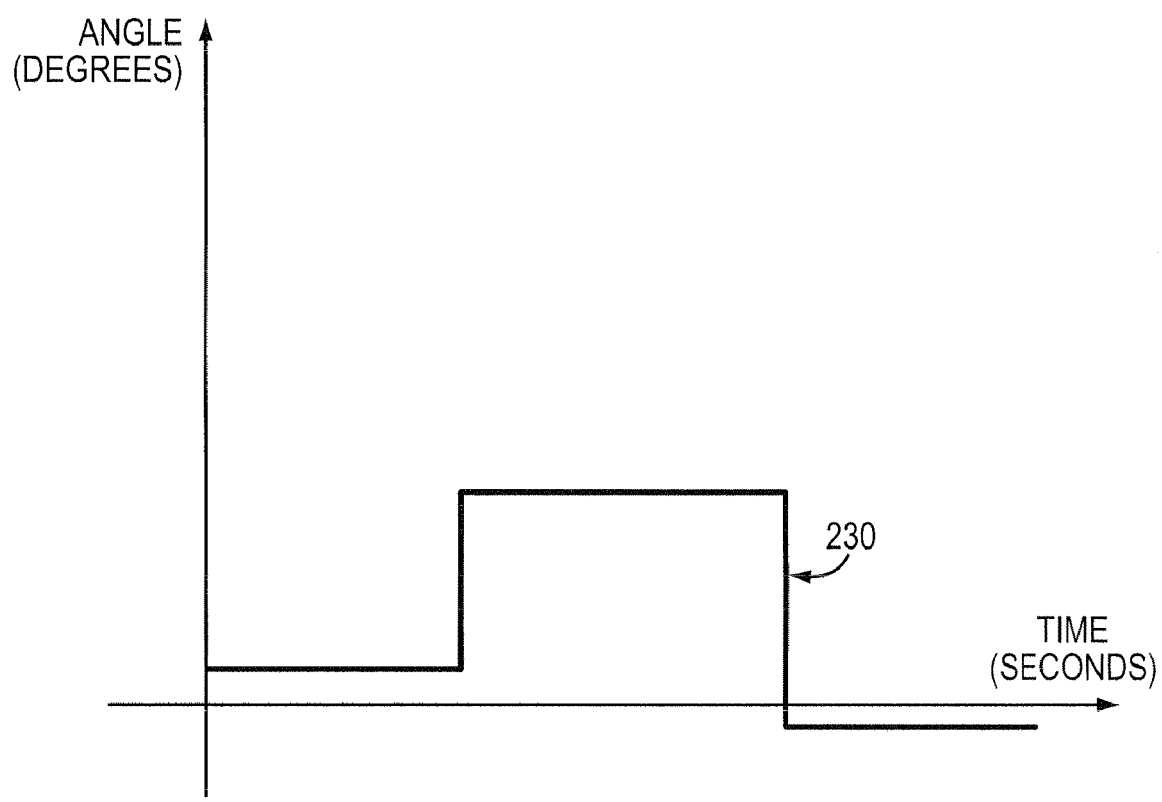
FIG. 4B is a plot of a rate of turn signal according to an example embodiment.

FIG. 4B is a plot of a rate of turn signal 230 according to an example embodiment. The rate of turn 230 is the measure of the rate of change of the angle between a device heading and a reference heading, which may include the true north or the magnetic north for the device. The example embodiment may obtain the rate of turn 230 from a gyroscope or a rate gyro.

Figure 4C:
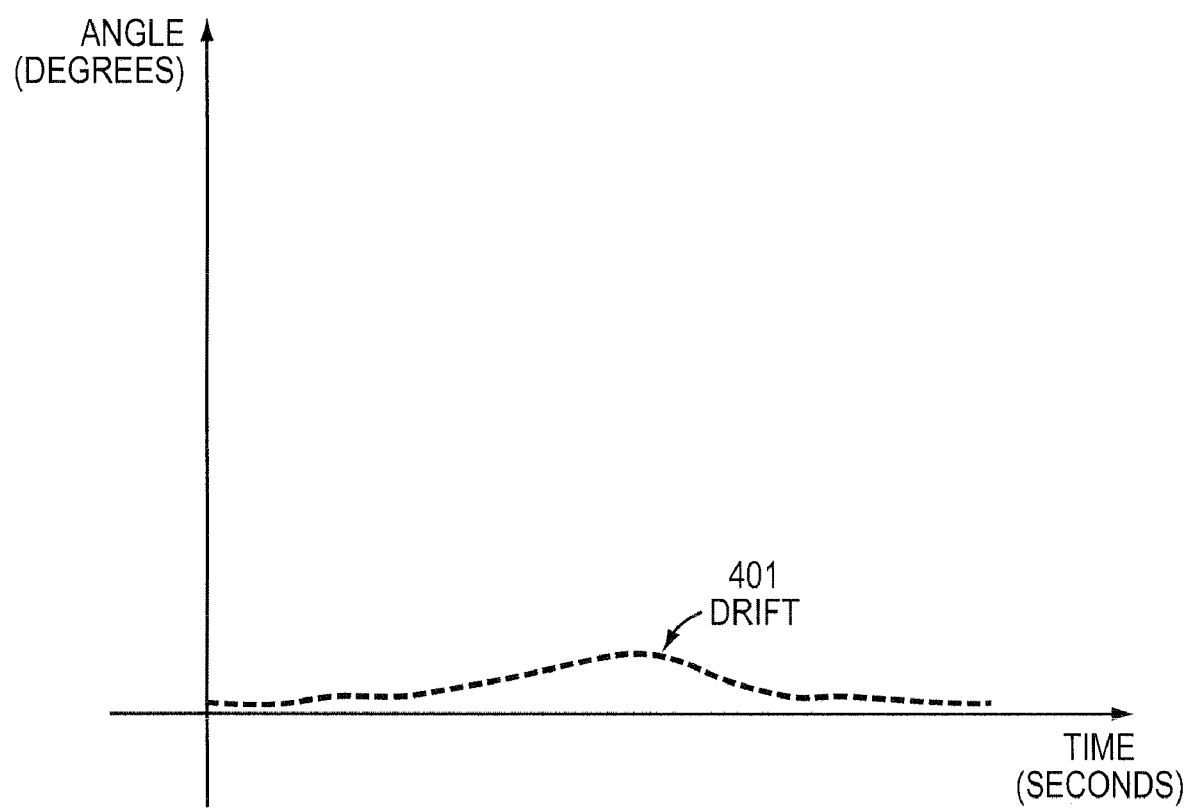
FIG. 4C is a plot of a drift signal according to an example embodiment.

FIG. 4C is a plot of a drift signal 401 according to an example embodiment. As explained above the rate of turn may be obtained from inertial heading devices such as a gyroscope or a rate gyro. Such devices are often susceptible to a drift (i.e., small errors in measurements of angular velocity and zero fluctuations) induced by physical properties of the manufacture of the device and changes of temperature. Thus, the rate of turn 230 may suffer from a drift 401, such as the drift signal 401 shown on FIG. 4C.

Figure 4D:
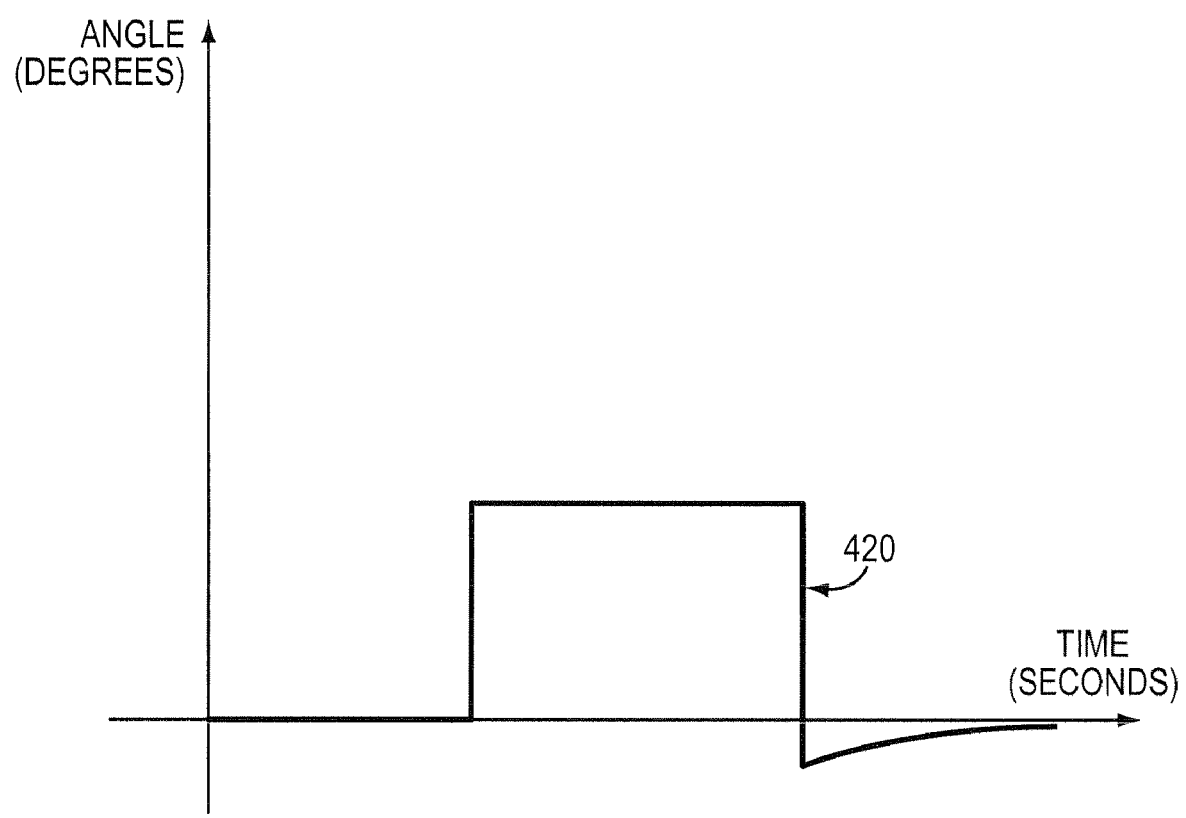
FIG. 4D is a plot of a corrected yaw rate signal according to an example embodiment.

FIG. 4D is a plot of a corrected yaw rate signal 420 according to an example embodiment. The example embodiment may filter the drift 401 in the rate of turn 230 to obtain a corrected yaw rate 420. The example embodiment may filter the drift 401 by assuming that it occurs over a long time frame, and remove any very long term Bias artifacts with a low pass filter. The example embodiment may additionally compensate the Bias by long term measurements from an inertial heading or long term measurements from a magnetic heading.

Figure 4E:
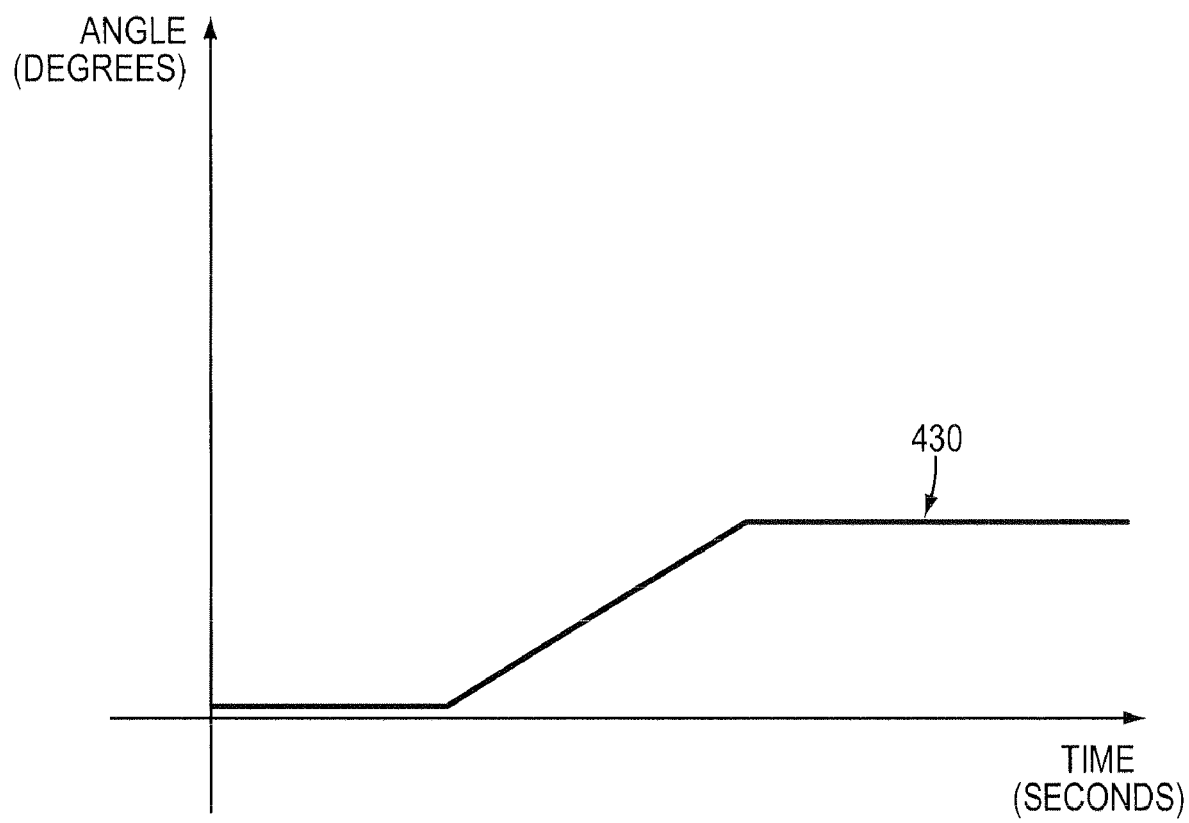
FIG. 4E is a plot of a relative heading signal according to an example embodiment.

FIG. 4E is a plot of a relative heading signal 430 according to an example embodiment. The example embodiment may obtain a relative heading 430 for the device based on the corrected yaw rate 420. The example embodiment may employ an integrator 630 (shown later in FIG. 6) to translate the corrected yaw rate 420 into the relative heading 430.

Figure 4F:
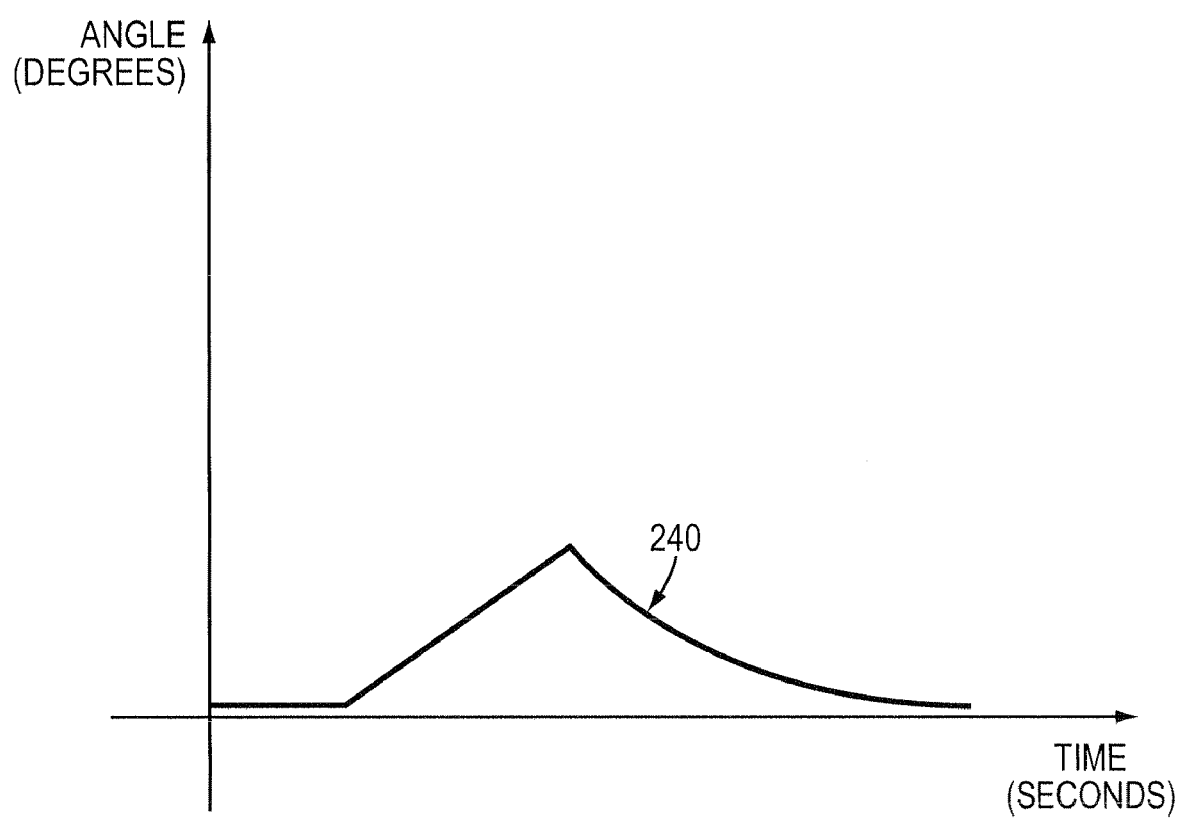
FIG. 4F is a plot of an instantaneous inertial heading signal according to an example embodiment.

FIG. 4F is a plot of an instantaneous inertial heading 240 signal according to an example embodiment. The example embodiment may filter the relative heading 430 to remove any possible corruptions and obtain an instantaneous inertial heading 240 for the device.

Figure 5:
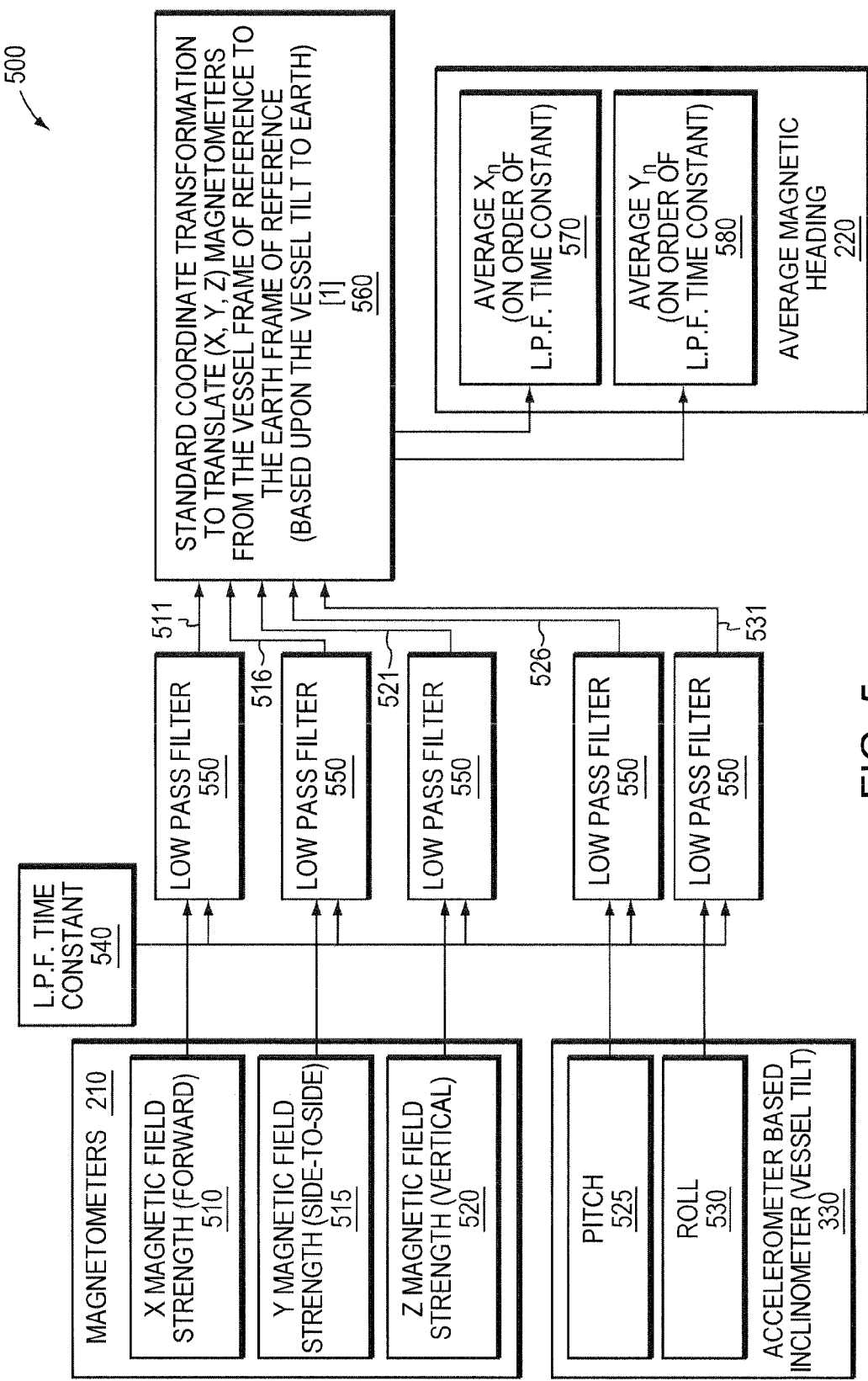
FIG. 5 is a block diagram illustrating procedures for obtaining average magnetic heading according to an example embodiment.

FIG. 5 is a block diagram illustrating procedures for obtaining average magnetic heading according to an example embodiment.

In this example embodiment 500 a magnetometer 210 provides the magnetic field strength for X (forward) 510, Y (side to side) 515, Z (vertical) 520 coordinates of the vessel. Additionally, an accelerometer based inclinometer may provide the tilt information 330 for the vessel. The tilt information 330 includes the pitch 525 and roll 530 components of the orientation of the vessel.

The example embodiment 500 employs one or more low-pass filters 550, having a low-pass filter time constant 540, to remove possible artifacts from the magnetometer 210 data.

In a mobile environment, tilt calculation devices, such as accelerometers, are susceptible to acceleration of translation, which can corrupt tilt calculations. The example embodiment 500 assumes that motion is periodic on some time frame and that the device does not accelerate in one translational direction indefinitely, and employs one or more low-pass filters 550, having a low-pass filter time constant 540, to remove possible corruptions in tilt 330 calculations.

The example embodiment 500 then translates 560 the tilt 330 and the magnetic field strength vector [X, Y, Z] such that they all assume the same frame of reference. Specifically, the system performs standard coordinate transformation to translate the filtered [X, Y, Z] 511, 516, 521 of the magnetometer from a device (e.g., the vessel 100) frame of reference to the earth frame of reference. The translation 560 is done as a function of the filtered tilt 529, 531. This calculation results in the average magnetic heading of the device 220 over some period of time, determined by the low-pass filter. The average magnetic heading 220 includes the magnetic field strength component $X_h$ 570, the magnetic field strength component $Y_h$ 580, and the magnetic field strength component $Z_h$ (not shown). The translation 560 may be done according to the following equation:

$$X_h = X\cos(\text{pitch}) + Y\sin(\text{pitch})\cos(\text{roll}) + Z\sin(\text{pitch})\cos(\text{roll})$$

$$Y_h = Y\cos(\text{roll}) - Z\sin(\text{roll}).$$

The above equation translates the filtered [X, Y, Z] 511, 516, 521 of the magnetometer from a device (e.g., the vessel 100) frame of reference to the earth frame of reference to obtain magnetic field strength components $X_h$ 570 and $Y_h$ 580.

Figure 6:
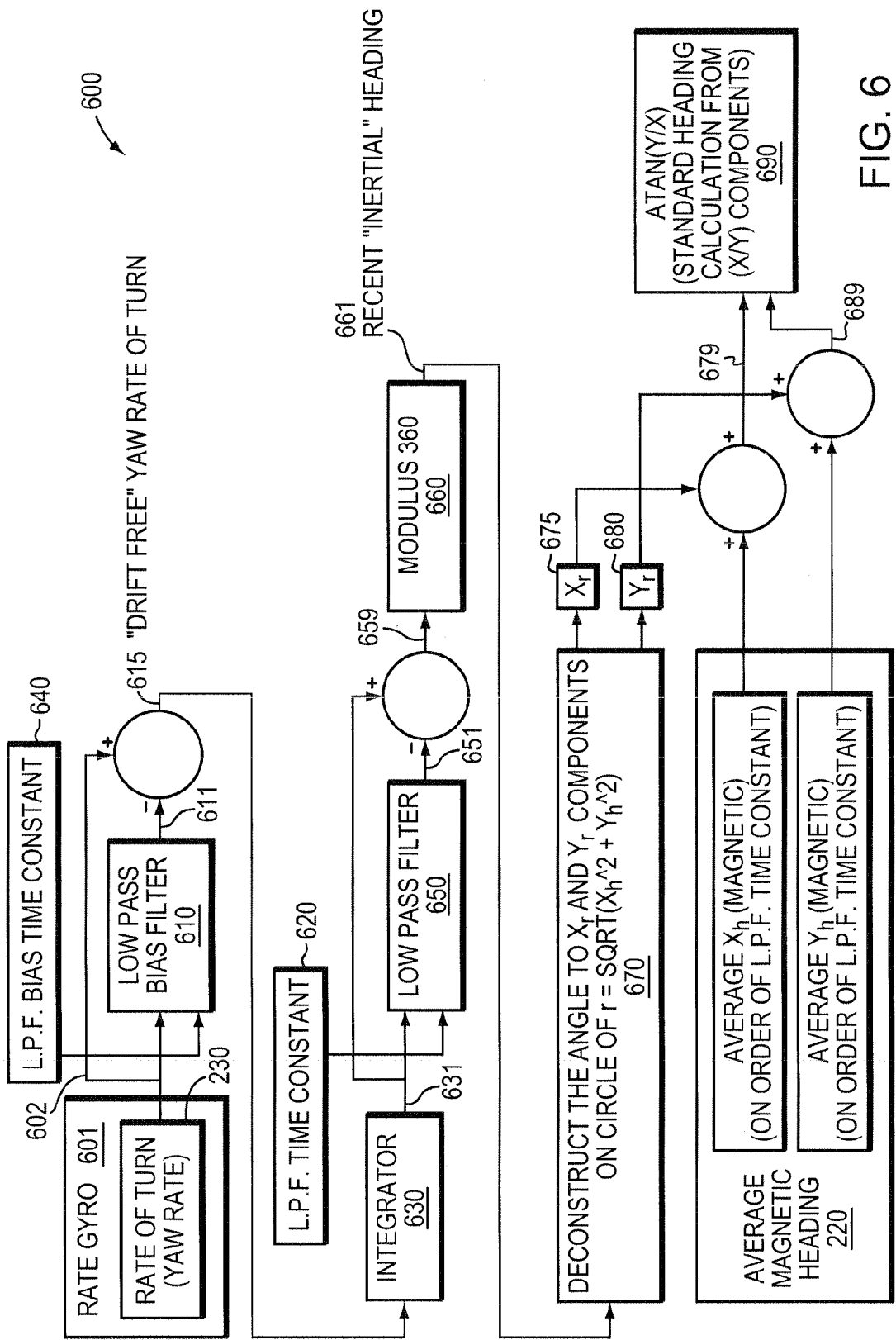
FIG. 6 is a block diagram illustrating procedures for obtaining instantaneous inertial heading according to an example embodiment.

FIG. 6 is a block diagram illustrating procedures for obtaining instantaneous inertial heading according to an example embodiment.

In this example embodiment 600, an inertial heading device, such as a rate gyro 601 is provided to determine the rate of turn 230 (yaw rate) for the device (e.g., the vessel 100). Inertial heading devices are often susceptible to a drift (i.e., small errors in measurements of angular velocity and zero fluctuations) induced by physical properties of the manufacture of the device and changes of temperature, the example embodiment 600 may need to filter the drift suffered by the inertial heading device.

The example embodiment 600 employs a low-pass filter 610, having a low-pass filter bias time constant 640 to remove possible drift from the rate of turn 230 data. The example embodiment 600 filters the drift by assuming that it occurs over a long time frame, and removes any very long term artifacts with a low pass filter. The example embodiment 600 may subtract the low-pass filtered data 611 from the actual rate of turn 602 to obtain a drift-free data 615.

The drift-free data 615 may then be passed through an integrator 630 to provide a relative inertial heading 631. The relative inertial heading 631 is indicative of the inertial heading of the device with respect to its own frame of reference. The example embodiment may employ a low-pass filter 650 having a low-pass filter time constant 620, to remove any possible artifacts in the relative heading. The example embodiment 600 may subtract the low-pass filtered relative inertial heading 651 from the actual relative inertial heading 631 to obtain a filtered relative inertial heading 659.

The filtered relative inertial heading 659 may be passed through a module (labeled in FIG. 6 as modulus-360) 660 that is responsible for ensuring that the relative heading is based on the device frame of reference. The output of this module 660 (modulus-360) is the current (or instantaneous) inertial heading 661 of the device. The current inertial heading 661 is used to indicate the inertial heading of the device given its rate of turn over time. For example if the device makes turns at ten degrees per second for a period of five seconds, the computed inertial headings indicates a fifty degree turn from the initial heading of the device.

The current inertial heading 661 is then deconstructed 670 to components $X_r$ 675 and $Y_r$ 680, which denote the forward 675 and side-to-side 680 components of the current inertial heading 661 respectively.

The example embodiment 600 combines the current inertial heading components ($X_r$ 675 and $Y_r$ 680) with their corresponding average magnetic heading components ($X_h$ 570 and $Y_h$ 580) to obtain accurate device heading 260. The merging of the components may be done by calculating $X_r + X_h$ to obtain the forward component of the device heading $X_D$ 679, and $Y_r + Y_h$ to obtain the side-to-side component of the device heading $Y_D$ 689. The example embodiment may obtain the accurate heading by determining the heading angle, based on the calculated components $X_D$ 679 and $Y_D$ 689, according to the following equation:

$$\text{accurate heading} = inv\,\tan\left(\frac{Y_D}{X_D}\right),$$

where the operator $inv\,\tan(\cdot)$ 690 denotes the inverse tangent operator.

The example embodiment does not require temperature compensation of the inertial heading device (e.g., rate gyro).

Figure 7:
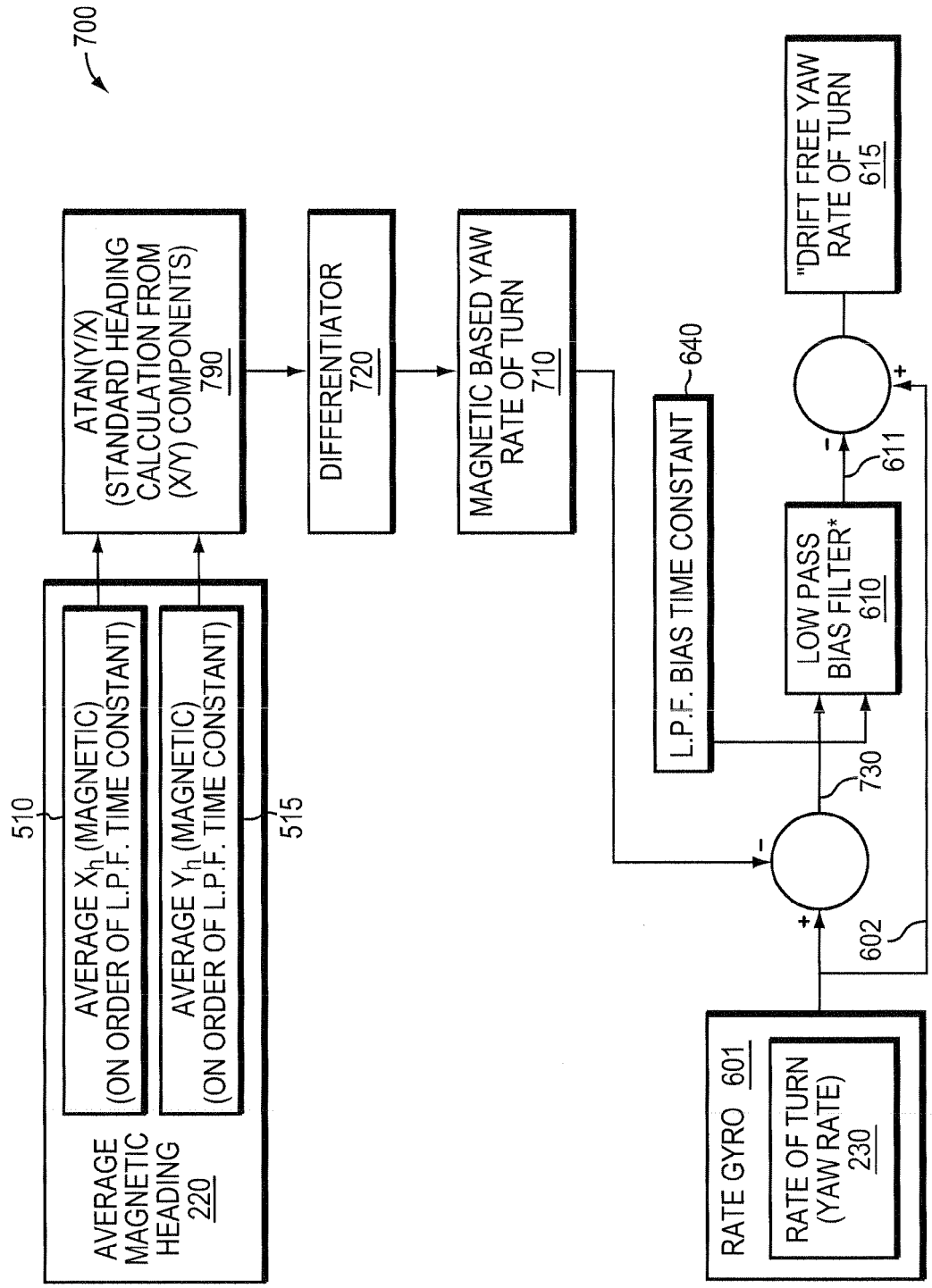
FIG. 7 is a block diagram of an example embodiment illustrating procedures for correcting yaw rate gyro drift from magnetic heading.

FIG. 7 is a block diagram of an example embodiment illustrating procedures for correcting yaw rate gyro drift from magnetic heading. This example embodiment 700 provides an improved method of eliminating yaw drift. By inputting the average magnetic heading 220, the example embodiment 700 no longer requires the assumption that the device is not rotating in the same direction on average.

The average magnetic heading 220 includes the magnetic field strength component $X_h$ 570, the magnetic field strength component $Y_h$ 580, and possibly the magnetic field strength component $Z_h$ (not shown).

The example embodiment may obtain the magnetic based rate of turn 710 by determining the heading angle, based on the average magnetic components $X_h$ 510 and $Y_h$ 515, according to the following equation:

$$\text{accurate heading} = inv\ \tan\left(\frac{Y_h}{X_h}\right),$$

where the operator inv tan(·) 790 denotes the inverse tangent operator.

A differentiator 720 is employed to determine a current magnetic based yaw rate of turn 720 (i.e., possibly in degrees per second) from the average magnetic heading 220.

In order to calculate the current rate of turn of the magnetic heading, the differentiator 720 compares the current average magnetic heading 220 to previously obtained magnetic heading(s) measurements over the time elapsed between the measurements. Unlike the rate of turn data obtained from an inertial heading device such as a rate gyro, this rate of turn is not susceptible to a drift. The result of the differentiator 720 may also be filtered to remove possible corruptions.

An inertial heading device, such as a rate gyro 601 may be provided to determine the rate of turn 230 for the device. Inertial heading devices are often susceptible to a drift (i.e., small errors in measurements of angular velocity and zero fluctuations) induced by physical properties of the manufacture of the device and changes of temperature, the example embodiment 700 may need to filter the drift suffered by the inertial heading device.

The example embodiment 700 may subtract the magnetic based rate of turn 710 from the data derived from the rate gyro 601 to obtain a drift free yaw rate of turn 615.

The example embodiment 700 employs a low-pass filter 610, having a low-pass filter bias time constant 640 to remove possible drift from the relative heading 730 data. The example embodiment 700 filters the drift by assuming that it occurs over a long time frame, and removes any very long term artifacts with a low pass filter. The example embodiment 700 may subtract the low-pass filtered data 611 from the actual rate of turn 602 to obtain a drift-free yaw rate of turn 615.

The drift-free yaw rate of turn 615 obtained from this example embodiment 700 may be fed into the integrator 630 of the example embodiment shown in FIG. 6 and be used to obtain the accurate device heading 260.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
in a processor, compensating a time delay of an inertial heading of a device by continuously filtering long term drift from measurements of the inertial heading of the device and subtracting the continuously filtered drift from the inertial heading of the device, wherein continuously filtering long term drift includes applying at least one low-pass filter to the inertial heading and adjusting the at least one low-pass filter based on long term measurements from the inertial heading; and
determining an accurate device heading as a function of continuously combining an average magnetic heading of the device with the compensated inertial heading.

2. The method of claim 1 including determining the average magnetic heading as a function of translating a magnetic heading from a device frame of reference to earth's frame of reference.

3. The method of claim 2 wherein determining the average magnetic heading includes correcting the magnetic heading to remove artifacts.

4. The method of claim 3 wherein correcting the magnetic heading includes applying at least one low-pass filter to the magnetic heading to remove the artifacts.

5. The method of claim 2 wherein determining the average magnetic heading includes correcting orientation measurements of the device frame of reference to remove short term dynamic accelerations.

6. The method of claim 5 wherein correcting orientation measurements includes applying at least one low-pass filter to the orientation measurements of the device frame of reference to remove the short term dynamic accelerations.

7. A method comprising:
in a processor, continuously combining an error corrected inertial heading of a device, obtained from continuously filtering long term drift from measurements of an inertial heading of the device and subtracting the continuously filtered drift from the inertial heading of the device, with an average magnetic heading of the device to provide accurate device heading;
wherein continuously filtering long term drift includes applying at least one low-pass filter to the inertial heading and adjusting the at least one low-pass filter based on long term measurements from the inertial heading.

8. The method of claim 7 including adjusting the at least one low-pass filter by long term measurements from the magnetic heading.

9. The method of claim 7 including determining the average magnetic heading as a function of translating a magnetic heading from a device frame of reference to earth's frame of reference.

10. The method of claim 9 wherein determining the average magnetic heading includes correcting the magnetic heading to remove artifacts.

11. The method of claim 10 wherein correcting the magnetic heading includes applying at least one low-pass filter to the magnetic heading to remove artifacts.

12. The method of claim 9 wherein determining the average magnetic heading includes correcting orientation measurements of the device frame of reference to remove short term dynamic accelerations.

13. The method of claim 12 wherein correcting orientation measurements includes applying at least one low-pass filter to the orientation measurements of the device frame of reference to remove the short term dynamic accelerations.

14. An apparatus comprising:
a compensation module to compensate a time delay of an inertial heading by continuously filtering long term drift from measurements of the inertial heading and subtracting the continuously filtered drift from the inertial heading, wherein continuously filtering long term drift includes applying at least one low-pass filter to the inertial heading and adjusting the at least one low-pass filter based on long term measurements from the inertial heading; and
a determination module to determine an accurate device heading as a function of continuously combining an average magnetic heading with the compensated inertial heading.

15. The apparatus of claim 14 including a second determination module arranged to translate a magnetic heading from a device frame of reference to earth's frame of reference to determine the average magnetic heading.

16. The apparatus of claim 15 wherein the second determination module is arranged to determine the average magnetic heading as a function of correcting the magnetic heading to remove artifacts.

17. The apparatus of claim 16 wherein the second determination module is arranged to correct the magnetic heading as a function of applying at least one low-pass filter to the magnetic heading to remove artifacts.

18. The apparatus of claim 15 wherein the second determination module is arranged to determine the average magnetic heading as a function of correcting orientation measurements of the device frame of reference to remove short term dynamic accelerations.

19. The apparatus of claim 18 wherein the second determination module is arranged to correct orientation measurements as a function of applying at least one low-pass filter to the orientation measurements of the device frame of reference to remove the short term dynamic accelerations.

20. An apparatus comprising:
a combination module arranged to continuously combine an error corrected inertial heading, obtained from continuously filtering long term drift from measurements of an inertial heading and subtracting the continuously filtered drift from the inertial heading, with an average magnetic heading to provide accurate device heading, wherein continuously filtering long term drift includes applying at least one low-pass filter to the inertial heading and adjusting the at least one low-pass filter based on long term measurements from the inertial heading; and
a reporting module arranged to report the provided accurate device heading.

21. The apparatus of claim 20 wherein the adjustment module is further arranged to adjust the at least one low-pass filter by long term measurements from the magnetic heading.

22. The apparatus of claim 20 including a determination module arranged to translate a magnetic heading from a device frame of reference to earth's frame of reference to determine the average magnetic heading.

23. The apparatus of claim 22 wherein the determination module is arranged to determine the average magnetic heading as a function of correcting the magnetic heading to remove artifacts.

24. The apparatus of claim 23 wherein the determination module is arranged to correct the magnetic heading as a function of applying at least one low-pass filter to the magnetic heading to remove artifacts.

25. The apparatus of claim 22 wherein the determination module is arranged to determine the average magnetic heading as a function of correcting orientation measurements of the device frame of reference to remove short term dynamic accelerations.

26. The apparatus of claim 25 wherein the determination module is arranged to correct orientation measurements as a function of applying at least one low-pass filter to the orientation measurements of the device frame of reference to remove the short term dynamic accelerations.

27. A computer program product comprising a non-transitory computer readable medium having computer readable code stored thereon, which, when executed by a processor, causes the processor to:
compensate a time delay of an inertial heading by continuously filtering long term drift from measurements of the inertial heading and subtracting the continuously filtered drift from the inertial heading, wherein continuously filtering long term drift includes applying at least one low-pass filter to the inertial heading and adjusting the at least one low-pass filter based on long term measurements from the inertial heading; and
determine an accurate device heading as a function of continuously combining an average magnetic heading with the compensated inertial heading.

28. An apparatus comprising:
a rate gyro determining rate of turn data for a device;
a low-pass filter coupled to the rate gyro, the low-pass filter continuously filtering long term drift from the rate of turn data and arranged to be adjusted based on long term measurements from an inertial heading; and
a subtractor coupled to the rate gyro, the low-pass filter, and an integrator, the subtractor subtracting the continuously filtered drift from the rate of turn data, the subtractor output being passed through the integrator providing a relative inertial heading of the device.

29. The apparatus of claim 28 wherein the low-pass filter is a first filter, the subtractor is a first subtractor and the integrator is additionally coupled to a second filter providing a filtered relative heading and a second subtractor providing a filtered relative inertial heading by subtracting the filtered relative heading from the relative inertial heading of the device.

30. The apparatus of claim 29 wherein the second filter is a second low-pass filter with a time constant removing artifacts in the relative heading.

31. A method comprising:
receiving rate of turn data for a device from a rate gyro;
coupling the rate gyro to a low-pass filter, the low-pass filter continuously filtering long term drift from the rate of turn data;
coupling a subtractor to the rate gyro, the low-pass filter, and an integrator;
subtracting the continuously filtered drift from the rate of turn data;
adjusting the low-pass filter based on long term measurements from an inertial heading; and
integrating an output of the subtractor providing a relative inertial heading of the device.

* * * * *